United States Patent [19]

Schenk

[11] Patent Number: 4,702,688

[45] Date of Patent: Oct. 27, 1987

[54] APPARATUS FOR PRODUCING ARTICLES FROM A SYNTHETIC RESIN

[76] Inventor: Bernd Schenk, Eibenweg 7,, D-7517 Waldbronn, Fed. Rep. of Germany

[21] Appl. No.: 852,282

[22] Filed: Apr. 15, 1986

[30] Foreign Application Priority Data

Apr. 15, 1985 [DE] Fed. Rep. of Germany ....... 3513388

[51] Int. Cl.$^4$ ............................................. B28B 3/00
[52] U.S. Cl. ................................ 425/450.1; 100/265; 100/290; 164/342; 249/162; 425/451; 425/451.7; 425/451.9; 425/454; 425/575
[58] Field of Search ................. 425/450.1, 451, 451.2, 425/451.3, 214, 182, 233, 235, 589, 590, 408, 410, 453, 454, DIG. 221, DIG. 223, 575, 451.7, 451.9; 249/162; 164/341, 342; 100/265, 266, 289, 290

[56] References Cited

U.S. PATENT DOCUMENTS

| | | | |
|---|---|---|---|
| 2,748,434 | 6/1956 | Amo | 164/342 X |
| 2,998,621 | 9/1961 | Adams et al. | 425/450.1 X |
| 3,427,851 | 2/1969 | Michelson | 100/266 X |
| 3,590,437 | 7/1971 | Annis, Jr. et al. | 100/290 X |
| 3,599,289 | 8/1971 | Girola | 425/575 X |
| 3,611,506 | 10/1971 | Schroeder | 425/450.1 |
| 3,648,600 | 3/1972 | Jaccard | 100/266 X |
| 3,914,975 | 10/1975 | Kawano | 425/214 X |
| 3,989,437 | 11/1976 | Kiefer et al. | 425/450.1 X |
| 4,029,457 | 6/1977 | Yamamoto | 425/451 X |
| 4,106,885 | 8/1978 | Poncet | 425/450.1 |
| 4,332,540 | 6/1982 | van de Caveye | 425/454 X |
| 4,484,874 | 11/1984 | Okawachi | 425/451.2 X |
| 4,592,714 | 6/1986 | Gutjahr | 425/451.2 X |

FOREIGN PATENT DOCUMENTS 2319926 10/1973 Fed. Rep. of Germany .
3103038 8/1982 Fed. Rep. of Germany .

Primary Examiner—Richard L. Chiesa
Attorney, Agent, or Firm—Karl F. Ross; Herbert Dubno

[57] ABSTRACT

A mold-closing and holding mechanism, especially for a deep drawing apparatus making hollow articles from a thermoplastic web provides force-storing elements between the mold halves and the drive so that when the drive which can use a check motor is cut off, the force-storing elements can continue to exert a uniform closure force at least upon the regions at which a weld is to be formed from the shaped parts.

13 Claims, 4 Drawing Figures

APPARATUS FOR PRODUCING ARTICLES FROM A SYNTHETIC RESIN

FIELD OF THE INVENTION

My present invention relates to an apparatus for producing articles from a synthetic resin material and, more particularly, to a mold closing and holding mechanism for an apparatus which is especially adapted to produce hollow articles from thermoplastic foils, e.g. packages formed by deep-drawing a pair of foil webs into respective package parts and fusing the package parts together along a parameter of the hollow space defined by the parts.

BACKGROUND OF THE INVENTION

It is known to deep-draw a thermoplastic foil to form a package part utilizing a mold having two mold halves which are brought together in a mold-closing position.

Two such foil webs of a single folded foil, of two separate foil strips, or of a flattened foil tube, may thus be introduced between a pair of mold halves, each of which is provided with a mold cavity and is constructed to allow the foil to be drawn and especially deep drawn into the respective cavity.

The two mold halves thus form a multipartite deep-drawing mold or form, each container part of which is formed in the respective mold half so that the two container halves are bonded together or fused between the mold halves of the closed form or mold.

When the two mold parts are separated, therefore, the finished synthetic resin container can be withdrawn.

Various mechanical devices or drives are used to bring the mold halves together and it is desirable to provide such drives so that they can operate at high speeds and also generate high mold-closure forces.

The principal mechanism used for this purpose is hydraulically actuated and the mechanism can include toggle linkages to generate the high closing forces and velocities, although directly operating multistep hydraulic cylinders can be employed as well. In smaller machines, however, indirect pneumatic drives and even electric-motor drives have been found to be advantageous.

In principle, however, all of these drives operate substantially similarly:

From a fully open position, with the mold halves at their maximum spacing, one or both of the mold halves can be displaced at high velocity to a stop position in which vacuum forming or deep drawing is effected, or into a first mold-closure position.

After a brief interval at this position, during which the deep-drawing operation can be effected, the mold is closed by further movement of one or both of the mold halves toward the other at a reduced velocity but with substantially higher force.

The drive is then shut down after mechanical locking of the form halves in the closed-mold position until forming of the article is complete. The forming of the article can include filling of a package defined by the deep-drawn foils.

After the end of the forming step, for removal of the completed article, the drive mechanism is operated to separate the mold halves at high velocity.

In the production of synthetic resin articles, especially hollow bodies of thermoplastic material as described, where two container halves are fused together at high pressure by movement of the mold halves together, there are differences in thickness of the foil between the mold halves of material-specific shrinkage processes which the foil must undergo.

This means, in systems in which the mold halves are located as described above for the prior art approach, that the closing and holding forces upon the mold do not remain constant, especially at the weld seams at which the synthetic resin is squeezed between the mold halves.

In many cases, therefore, because of the dimensional changes resulting from such shrinkage, the welding forces may be insufficient or irregular so that it is possible that excessively thin regions may be produced where the closing forces must be increased to compensate for dimensional changes, or sealing may be unsatisfactory where the force is insufficient because of such dimensional changes.

OBJECTS OF THE INVENTION

It is, therefore, the principal object of the present invention to provide an improved apparatus for producing synthetic resin articles and especially hollow articles from thermoplastic foil materials in which the foil is clamped between two mold halves, whereby the aforedescribed drawbacks are avoided.

A more general object of my invention is to provide an apparatus of the type described above which is capable of producing hollow articles of greater uniformity and freedom from defects.

Still another object of my invention is to provide a mold-closing and holding mechanism which can maintain a certain mold-closing force in spite of shrinkage or dimensional changes in the mold for all necessary production steps, including filling and forming of the article and especially such that, during the welding in the fabrication of a hollow thermoplastic article, the holding and closing force between the mold halves remains substantially constant without excessive drain on a motor or use of motor energy.

It is also an object of this invention to provide an improved mold-closing and holding mechanism that is especially effective with electric-motor-driven machines for the production of hollow articles.

SUMMARY OF THE INVENTION

These objects and others which become apparent hereinafter are attained, in accordance with the invention, by providing the mold halves of a deep drawing mold or form in the vacuum forming of hollow articles from a thermoplastic foil such that the form halves are each mounted by a plurality of force-storing elements upon the drive mechanism, i.e. upon respective plates which can be coupled to an electromotor drive so that once the drive has been brought to standstill, the force-storing elements which are stressed by the drive during the mold-closing operation, continue to exert force upon the mold halves against one another so that the two mold halves are connected together by this stress of the force-storing element and automatically compensate for changes in dimensional tolerances between the mold halves after the drive has been brought to standstill.

More specifically, the invention provides a mold-closing and holding mechanism for an apparatus for producing shaped articles from a thermoplastic material, which comprises:

respective drive members movable toward and away from one another;

a respective mold half mounted on each of the members and aligned with the other mold half to define a mold cavity upon movement of the members toward one another within which a respective shaped article is formed from the material;

drive means operatively connected to the members for forcing the members toward one another to close a mold formed by the mold halves, the drive means being haltable upon closure of the mold to maintain the mold closed, and for subsequently drawing the mold halves apart; and a respective plurality of force-storing elements connecting each of the mold halves with the respective one of the members and stressed upon closure of the mold by the movement of the members toward one another to press the mold halves against one another while the mold is maintained closed and after halting of the drive means to automatically compensate for dimensional tolerances of the mold upon mold closure.

Preferably the drive means includes a high-overload-capacity electric motor and a threaded spindle assembly interconnecting the members for simultaneous but reciprocal movement.

Advantageously the drive means further includes a force-storing unit between the assembly and the high-overload-capacity electric motor and a brake between the assembly and the high-overload-capacity electric motor.

The force-storing elements can be compression springs or gas pressure springs, i.e. cylinders or the like provided with gas cushions, and it has also been found that the apparatus described, which is primarily intended for the fabrication of hollow thermoplastic articles from thermoplastic foils, can be used with advantage in other plastic-forming techniques, for example die-casting or pressure-casting and injection molding as well as injection embossing.

With the apparatus of the invention, the force-storing elements constitute an elastic mold-locking device.

Because the plates carrying the mold halves are suspended by the springs, in accordance with the invention, it is possible to use as a mold-closing motor a so-called servomotor which can have a brief overload during which the springs are stressed, whereupon the output shaft of this motor can be held by a brake. Indeed, it is possible to utilize the inertial moment of the motor for the final stressing of the springs and then lock the brake to maintain the closing force via the force-storing elements acting upon the mold halves.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
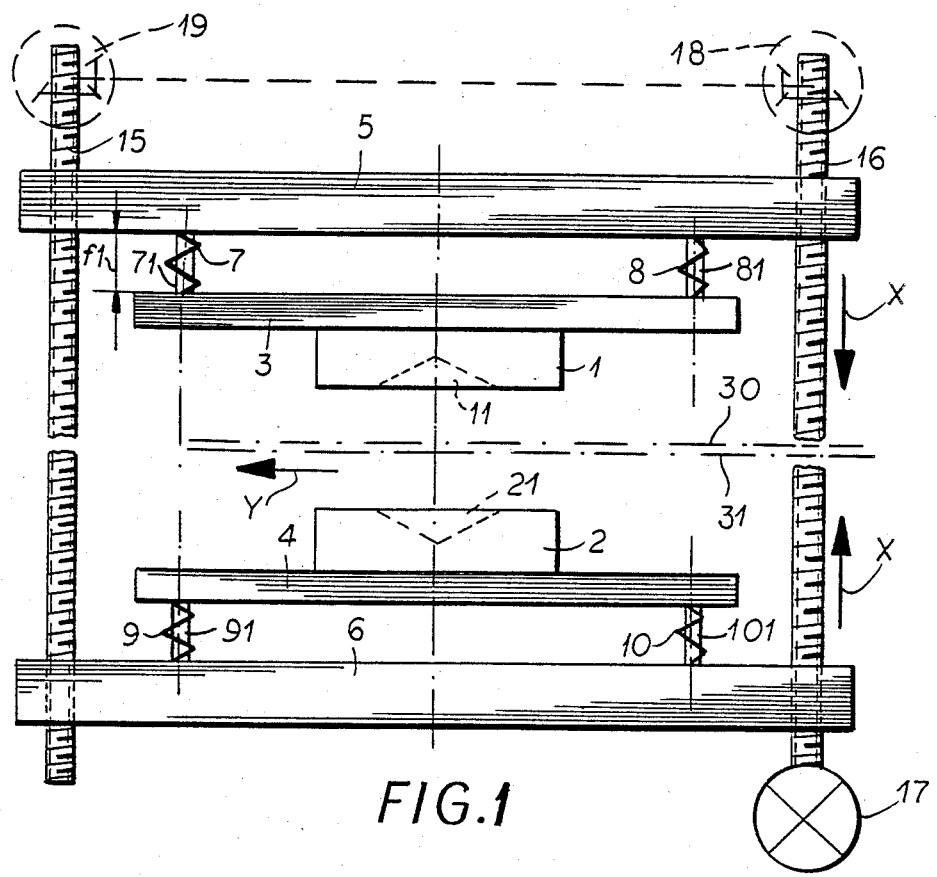
FIG. 1 is a diagrammatic elevational view showing the apparatus in the open position.

FIG. 1 shows two coaxially juxtaposed mold halves 1 and 2 which are held in a given spacing from one another in their rest position. The mold halves may be a functional deep-drawing or vacuum-forming mold members and each of the mold halves 1, 2 can be provided with a respective cavity 11, 21 as shown in broken lines.

When the vacuum is applied to the cavities 11, 21 during the forming operation, synthetic resin or foam plastic foils spanned across the cavities are drawn against the walls thereof to form respective hollow bodies which are fused together when the mold halves are pressed against one another in the mold-closing operation.

The mold-halves 1, 2 are mounted upon respective mold plates 3 and 4 whose outer dimensions are greater than those of the mold halves. Along the peripheries or edge regions of these plates 3 and 4, the plates are guided on respective support members or traverses 5, 6 which, in turn, can be displaced by the drive means toward and away from one another to bring the mold halves together or draw them apart.

The suspension of the plates 3 and 4 on the members 5 and 6 is so effected in accordance with the invention, that force-storing elements 7, 8, 9, 10 in the form of compression springs, are interposed between each plate and the respective member. The force-storage elements 7–10 hold the plates 3 and 4 at a distance f1 from traverses 5 and 6 respectively in the rest position of the apparatus shown in FIG. 1. The coil springs here surround guide pins 71, 81, 91, 101 affixed to the members 5 and 6, respectively, and passing with clearance through the plates 3 and 4.

The relative movement of the members 5 and 6, i.e. their displacement toward and away from one another, is effected by threaded spindles 15, 16 forming a mechanism in which the spindles are coupled for synchronous movement by bevel-gear sets 18 and 19. The assembly is driven by electric motor 17 which can be provided with a brake (see FIG. 4).

The two spindles 15, 16 are so formed when each as provided over half of its length with threads of opposite hand so that the plates 5 and 6 are synchronously displaced toward and away from each other at the same rates. In other words, after the members 5 and 6 have reached an end position as shown in FIG. 1, reversal of rotation of the motor 17 will drive them simultaneously and synchronously toward one another in the directions represented by the arrows X. When they have reached their fully closed position (FIG. 2), the direction of rotation of the motor can be reversed to displace the members 5 and 6 in the opposite directions represented by the arrows Z.

Figure 2:
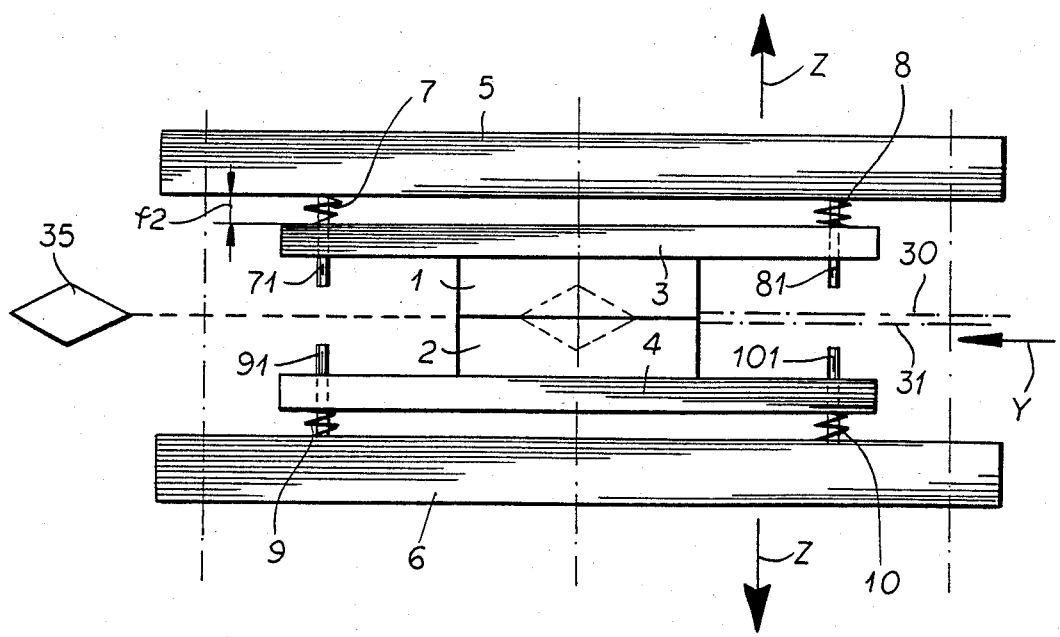
FIG. 2 is a similar view showing the apparatus in a closed position.

A pair of foil webs 30, 31 can be seen in highly diagrammatic form to be inserted between the mold halves from the right in the direction of arrow Y in FIG. 1. FIG. 2 shows the position of the apparatus when the mold is closed, i.e. the foil webs are clamped between the mold halves.

In operation, the motor 17 drives the members 5 and 6 in the direction of the arrows X toward one another until the mold halves 1, 2 have a certain small spacing from one another and in this position, as is conventional, vacuum is applied to the cavities and container halves in the form of half shells to be formed from the foil webs. On the edges of these half shells, fusion-weld seam profiles are provided which are then bonded together in the next step. The motor 17 is driven further in the direction of the arrows X, thereby compressing the springs to a length f2 which corresponds to the distance between each mold plate 3, 4 and the respective member 5, 6. Under the resulting increased force, a weld is formed between the half shells. The motor is turned off and the electromagnetic brake applied. The mold halves 1, 2 are suspended on the plates 3, 4 elastically since they receive with play, the pins 71, 81, 91, 101 so that a quasi-universal movement or quasi-cardanic movement is possible.

The synthetic resin hollow body is formed in the cavities of the mold halves 1 and 2 and the parts of this body are welded together. Any shrinkage along the weld seams, which can amount to tenths of a mm is compensated automatically by the quasi-elastic pressure between the mold halves 1 and 2. When the container is finished, the motor is reversed to open the mold by movement of the members in the direction of arrows Z, the finished article is expelled in the direction of arrow Y.

Figure 3:
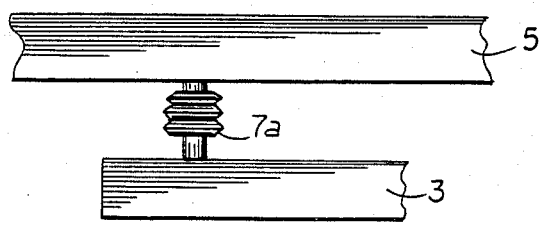
FIG. 3 is a detail view of a modification of the system of FIGS. 1 and 2.
Figure 4:
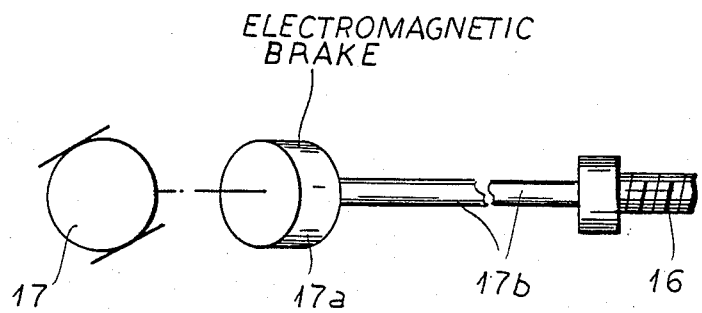
FIG. 4 is a diagram illustrating a modified drive for the spindle assembly of the apparatus of FIGS. 1 and 2 or of FIG. 3.

As can be seen from FIG. 3, in place of the springs 7-10, between each plate, e.g. plate 3 and the respective member, e.g. the member 5, a pressurized gas cushion may be provided in the form of a bellows 7a containing a gas which is compressed as the distance between the plate 3 and the member 5 is reduced from the distance f1 to the distance f2 as described. FIG. 4 shows that the drive for the spindle 16 can include an electromagnetic brake between a torsion bar force-storing element and the spindle 16. More particularly, the electric motor 17 can be seen to be coupled to the electromagnetic brake 17a which acts upon the torsion bar 17b, the latter forming a force-storing element. The electromagnetic brake 17a is a holding brake in accordance with the invention.

I claim:

1. A mold-closing and holding mechanism for an apparatus for producing shaped articles from a thermoplastic material, which comprises:
   respective drive members movable toward and away from one another;
   a respective mold half mounted on each of said members and aligned with the other mold half to define a mold cavity upon movement of said members toward one another within which a respective shaped article is formed from said material;
   drive means in the form of a high-overload-capacity electric motor mechanically connected to said members for forcing said members toward one another to close a mold formed by said mold halves, said drive means being haltable upon closure of said mold to maintain the mold closed, and for subsequently drawing said mold halves apart; and
   a respective plurality of force-storing elements in the form of compression springs connecting each of said mold halves with the respective one of said members and stressed upon closure of the mold by the movement of said members toward one another to press said mold halves against one another while said mold is maintained closed and after halting of said drive means to automatically compensate for dimensional tolerances of the mold upon mold closure.

2. The mold-closing and holding mechanism defined in claim 1 wherein said drive means further includes a threaded spindle assembly interconnecting said members for simultaneous but reciprocal movement, said high-overload-capacity electric motor being operatively connected to said assembly.

3. The mold-closing and holding mechanism defined in claim 2 wherein said drive means further includes a force-storing unit between said assembly and said high-overload-capacity electric motor.

4. The mold-closing and holding mechanism defined in claim 3 wherein said drive means further includes a brake between said assembly and said high-overload-capacity electric motor.

5. The mold-closing and holding mechanism defined in claim 2 wherein said drive means further includes a force-storing unit between said assembly and said high-overload-capacity electric motor.

6. The mold-closing and holding mechanism defined in claim 5 wherein said drive means further includes a brake between said assembly and said high-overload-capacity electric motor.

7. The mold-closing and holding mechanism defined in claim 2 wherein said force-storing elements are each a gas compression spring.

8. The mold-closing and holding mechanism defined in claim 7 wherein said drive means further includes a force-storing unit between said assembly and said high-overload-capacity electric motor.

9. The mold-closing and holding mechanism defined in claim 8 wherein said drive means further includes a brake between said assembly and said high-overload-capacity electric motor.

10. The mold-closing and holding mechanism defined in claim 2 wherein said mold halves form a deep-drawing mold for thermoplastic foil and are adapted to form respective parts of a container which is made by fusing the parts together when said mold is closed.

11. The mold-closing and holding mechanism defined in claim 2 wherein said mold halves form an injection mold.

12. The mold-closing and holding mechanism defined in claim 2 wherein said mold halves form an embossing mold.

13. The mold-closing and holding mechanism defined in claim 2 wherein said mold halves form a die-casting mold.

* * * * *